T. N. RUSSELL.
CAR ROOF.
APPLICATION FILED JAN. 5, 1915.
1,177,144.
Patented Mar. 28, 1916.
6 SHEETS—SHEET 2.
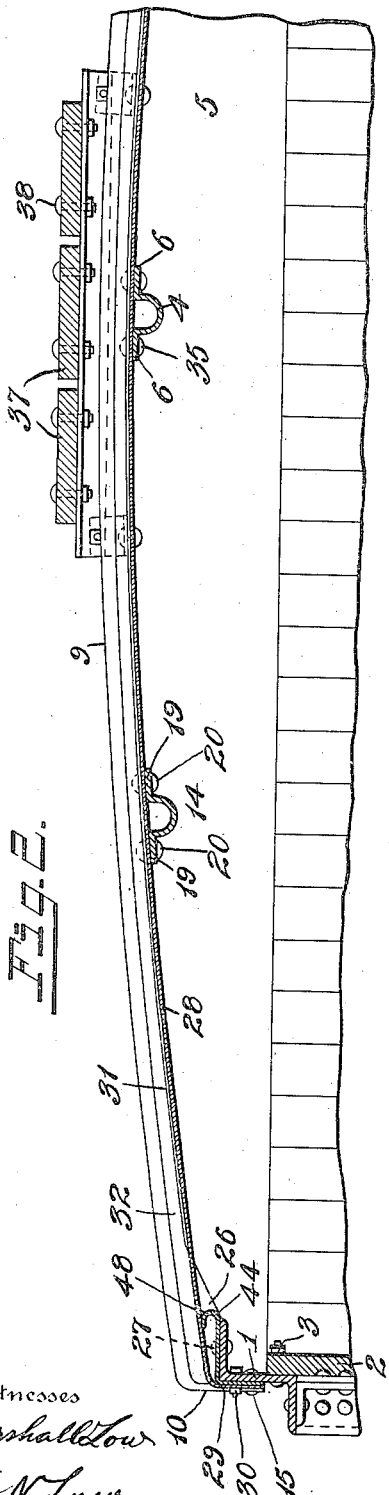
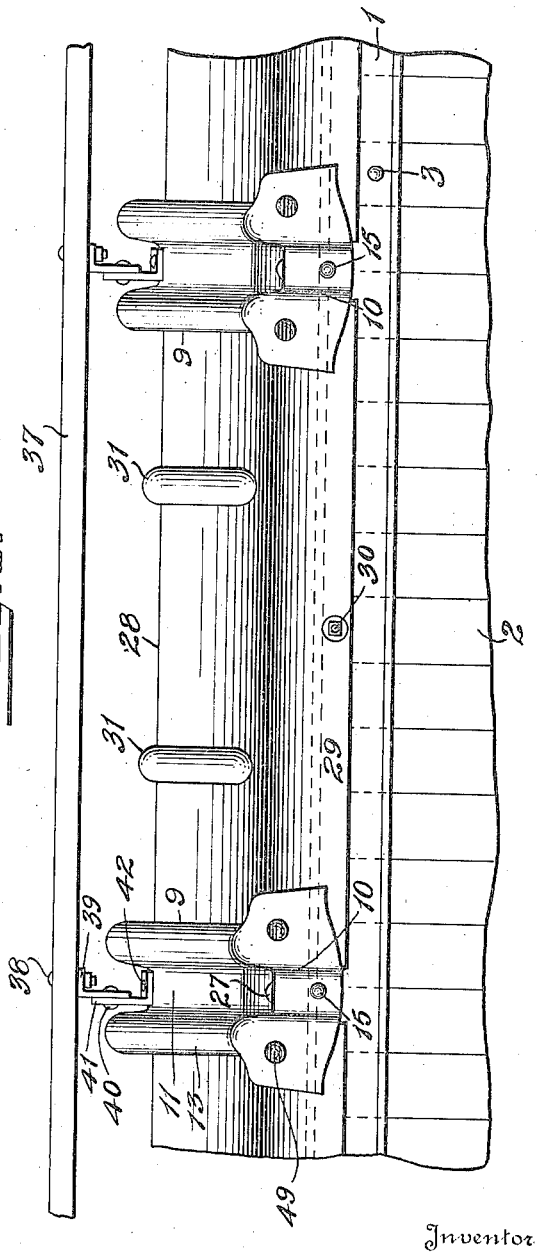
Witnesses
Marshall Low
N N Low
Inventor
Thomas Nathan Russell,
By Munday, Evarts, Adcock & Clarke
his Attorneys

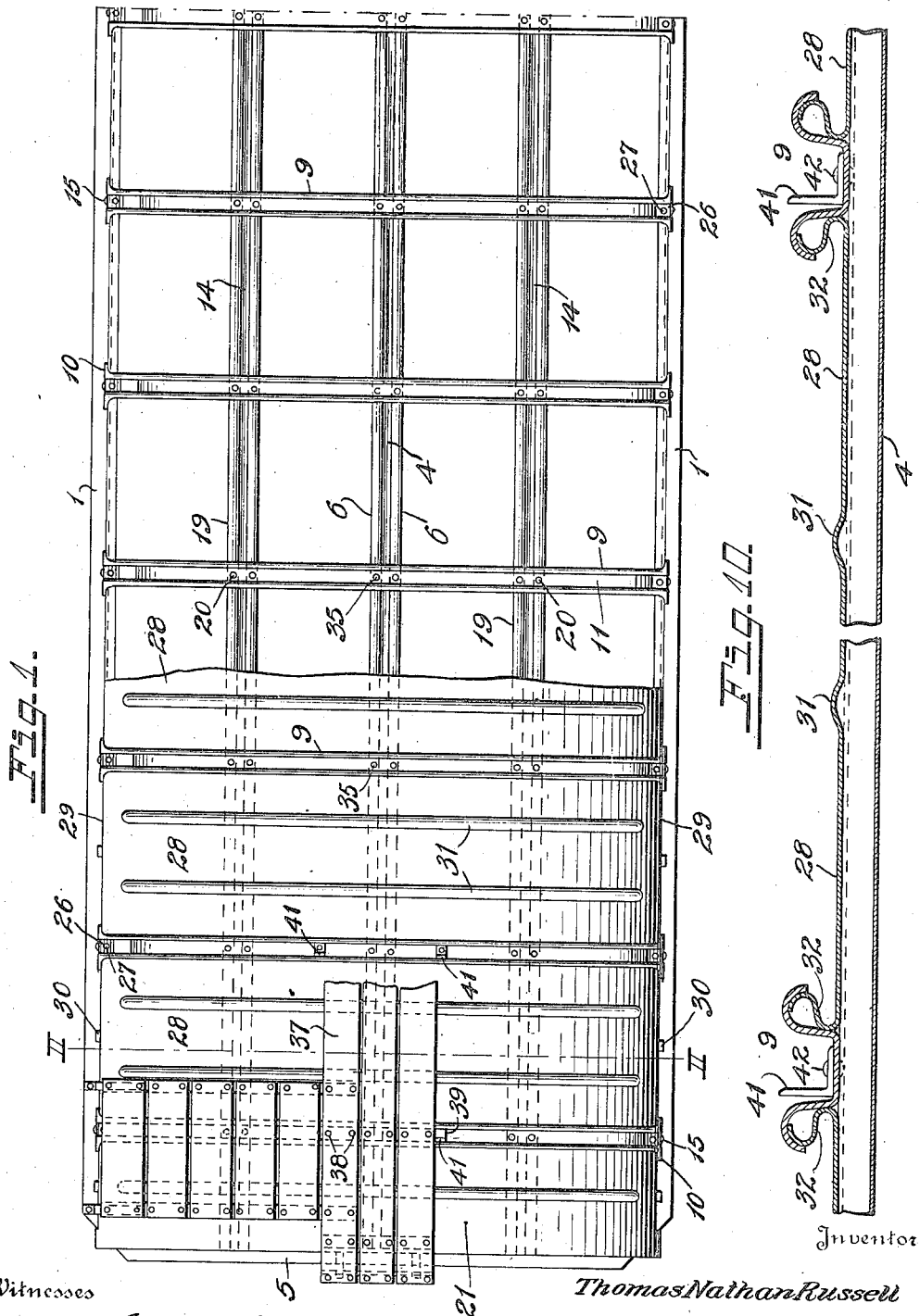

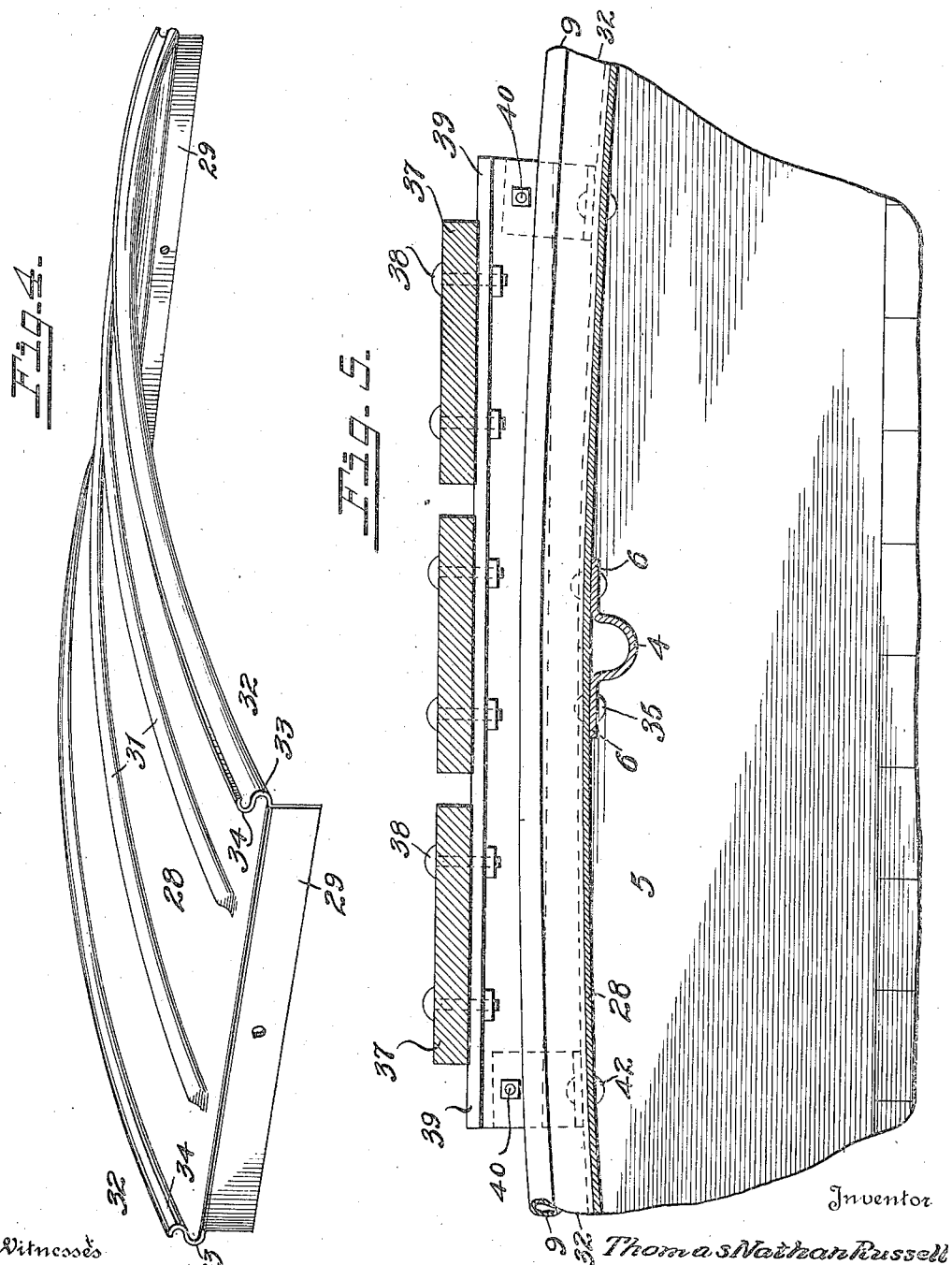

T. N. RUSSELL.
CAR ROOF.
APPLICATION FILED JAN. 5, 1915.
1,177,144.
Patented Mar. 28, 1916.
6 SHEETS—SHEET 4.
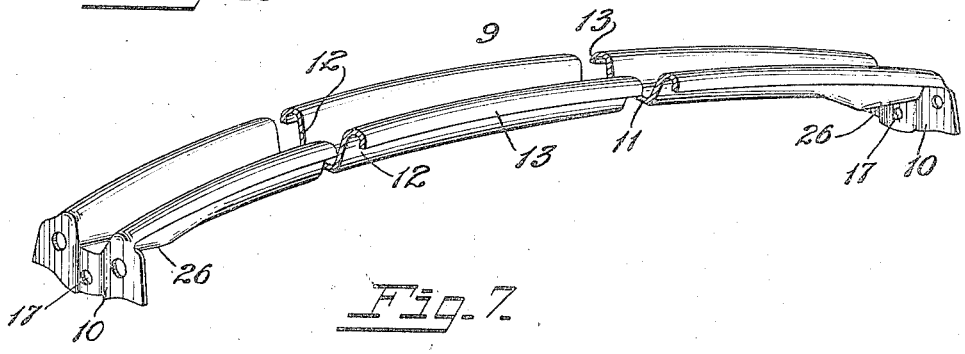
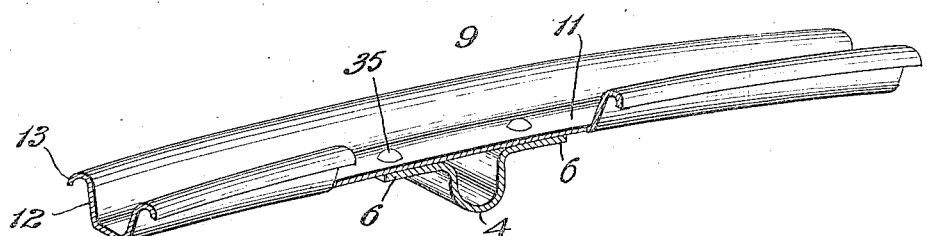
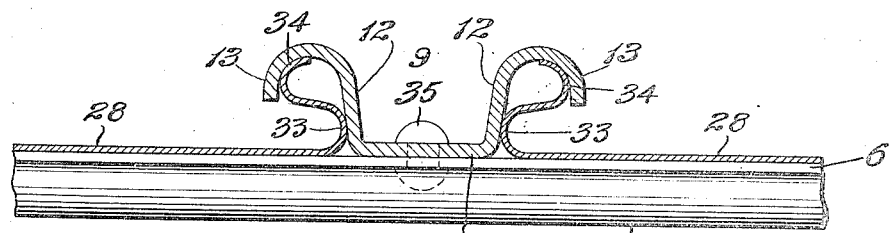
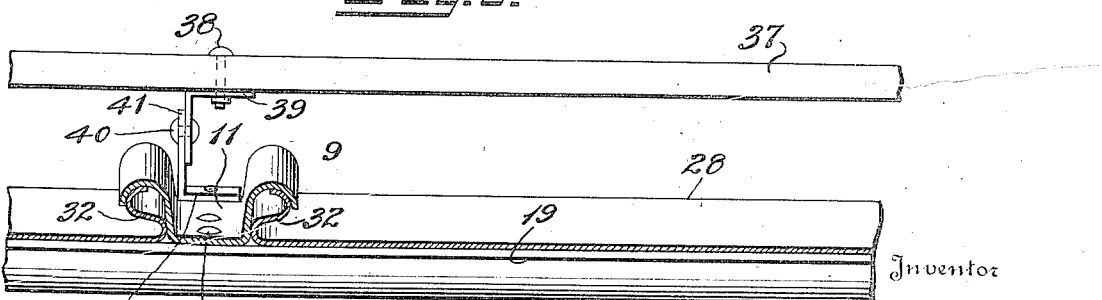
Witnesses
Marshall Low
N N Low
Inventor
Thomas Nathan Russell
By Munday, Evarts, Adcock & Clarke
his Attorneys

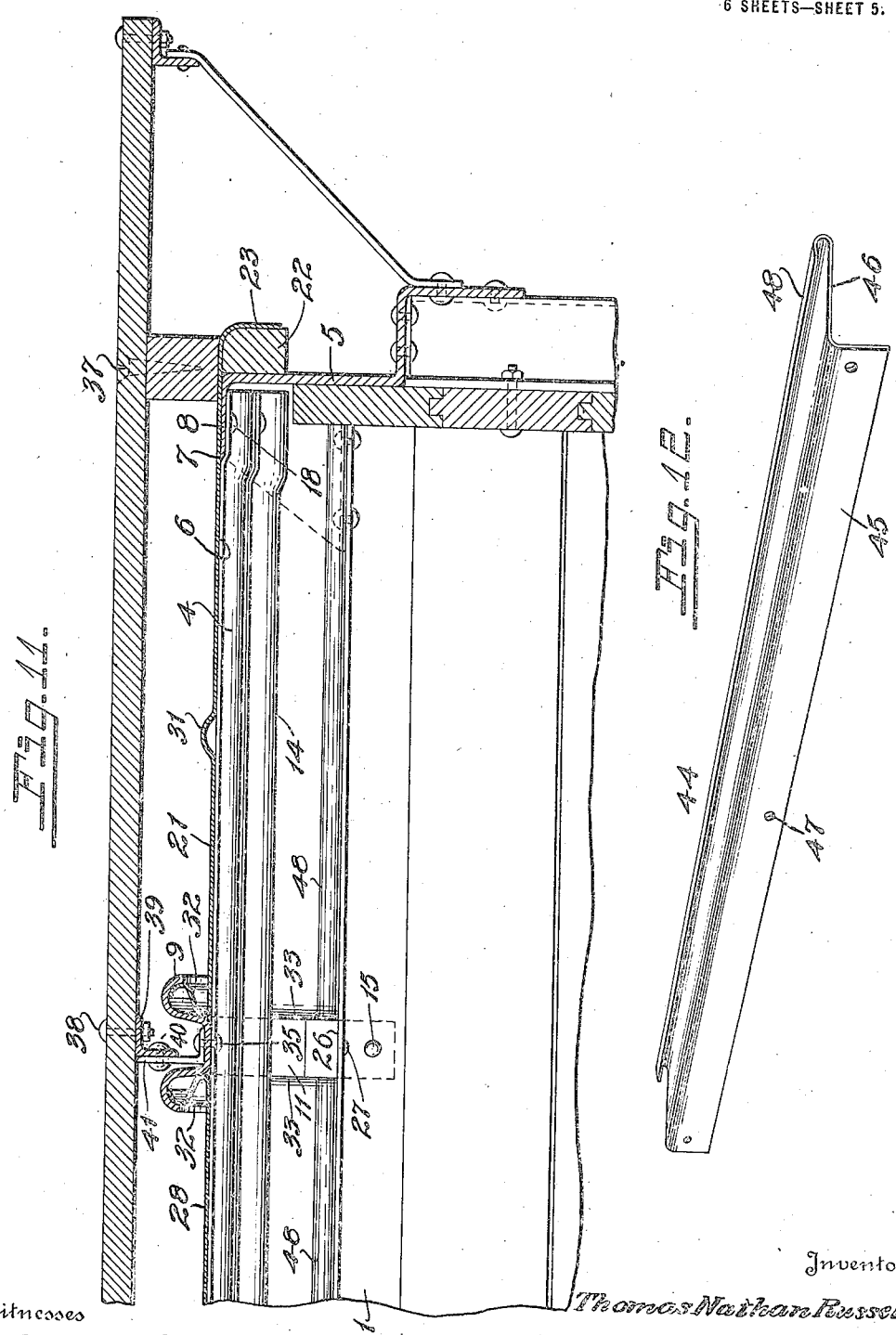

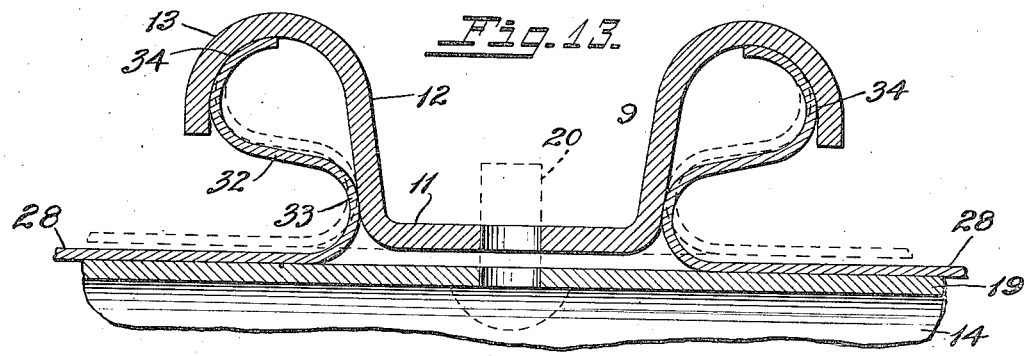
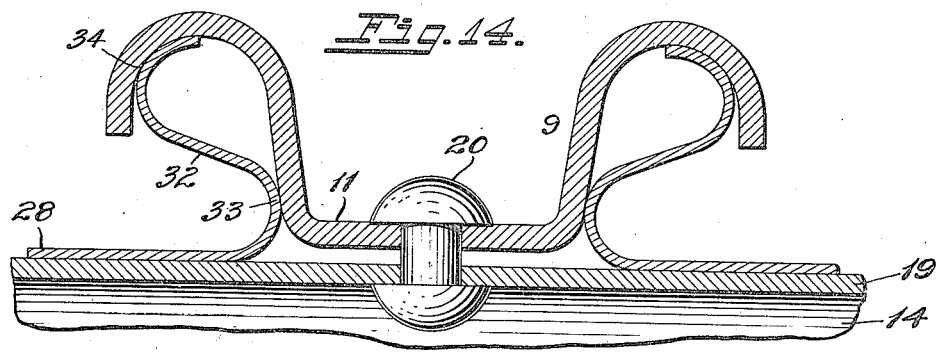
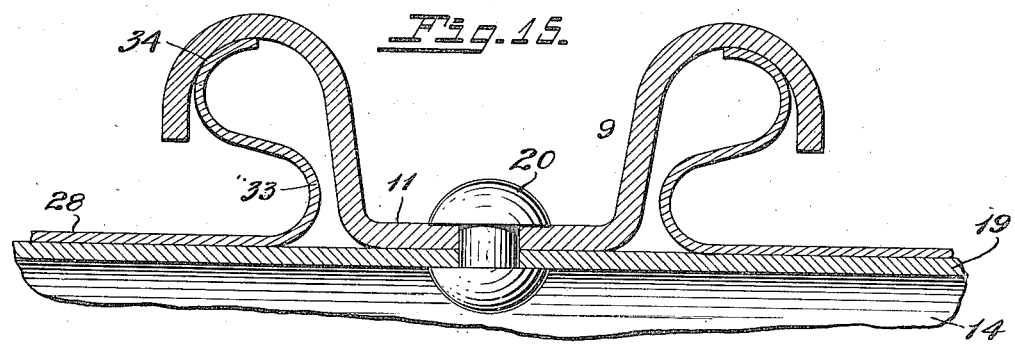
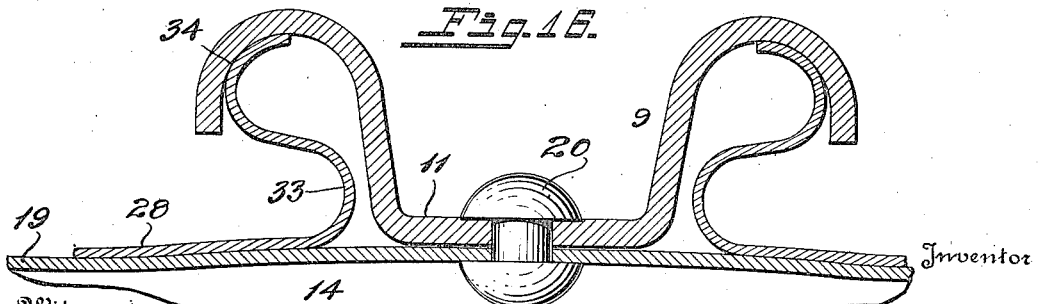

UNITED STATES PATENT OFFICE.

THOMAS NATHAN RUSSELL, OF CHICAGO, ILLINOIS, ASSIGNOR TO CHICAGO-CLEVELAND CAR ROOFING COMPANY, OF CHICAGO, ILLINOIS, A CORPORATION OF ILLINOIS.

CAR-ROOF.

1,177,144.   Specification of Letters Patent.   Patented Mar. 28, 1916.

Application filed January 5, 1915.  Serial No. 632.

*To all whom it may concern:*

Be it known that I, THOMAS NATHAN RUSSELL, a citizen of the United States, residing in Chicago, in the county of Cook and State of Illinois, have invented a new and useful Improvement in Car-Roofs, of which the following is a specification.

The invention relates primarily to all-steel self-sustaining car roofs, from which both inner and outer wooden or other sheathing may be omitted; and it relates more particularly to the construction of the carlines and of the roof sheets, and to the shapes of these parts, and to the manner in which they are fitted and combined together; with a view to the production of an imperforate steel roof, proof against leaking, and in which the parts are fitted tightly together, without intervening clearance spaces, for the purpose of enabling the roof sheets to aid the carlines in supporting weight, and to make the roof as a whole strong in all directions and efficiently weight-sustaining and strain-resisting, and to render it water-tight.

With the foregoing and other objects in view, the invention consists in the parts and combinations thereof hereinafter set forth and claimed.

In order to make the invention more clearly understood, I have shown in the accompanying drawings means for carrying the same into practical effect, without limiting my improvements, in their useful applications, to the particular constructions which, for the purpose of example, I have delineated.

In said drawings—Figure 1 is a plan view of a portion of a car roof embodying the invention, a portion of the roof sheets being broken away to display the roof frame. Fig. 2 is a vertical cross-section, on a larger scale, on line II—II of Fig. 1. Fig. 3 is a side elevation of a portion of the roof. Fig. 4 is a perspective view of one of the roof sheets. Fig. 5 is a vertical cross-section, on a still larger scale, on line II—II of Fig. 1, showing the ridge portion of the roof, and the roof sheet in section. Fig. 6 is a perspective view of the carline, portions of the same being broken away. Fig. 7 is a perspective view, on a larger scale, of the ridge portion of the carline, the same being partly broken away. Fig. 8 is a vertical section, longitudinal of the roof, showing portions of the ridge pole, the carline and the two roof sheets which engage the carline and purlins and ridge pole. Fig. 9 is a side view, partly in longitudinal section, showing portions of the purlin, the carline, two roof sheets, and the running board carried by the carline. Fig. 10 is a vertical longitudinal section showing a portion of the ridge pole, two carlines and portions of three roof sheets. Fig. 11 is a longitudinal vertical section at the end of the roof. Fig. 12 is a perspective view of one of the eaves flashing plates. Fig. 13 is a sectional view longitudinal of the car, showing the car roof sheets applied to a carline, and a purlin applied beneath the roof sheets, the purlin being not yet forced up to its final position to secure the roof sheets, the preliminary position of the edge portions of the roof sheets being shown in full lines, and their normal position, when forced into close union with the carline, being shown in dotted lines. Fig. 14 is a similar view of the roof sheets being forced into final position without making contact between the purlin and the under side of the carline. Fig. 15 is a similar view, the sheets being forced into final position, and the purlin being in contact with the carline, but the lower shoulders of the roof sheets not being necessarily in contact with the sides of the carline. Fig. 16 illustrates how the clamping of the parts into normal position may cause the purlin to bend down somewhat between the carlines, and to bend upward immediately beneath the carline.

Referring to the drawings, 1 indicates the side plates of the roof frame, consisting of Z-bars. The top member of the Z-bar serves as a rest for the end of the carline. To the vertical member or web are attached on the outside the overlapping vertical ends or flanges of the roof sheets and carlines, and on the inside are attached the upper ends of the side sheathing; and the lower member or flange of the side plate extends outward beyond the other parts of the roof to serve as a protecting means for the ends of the roof sheets and carlines and take the place of a fascia, or to form a place of attachment for the upper ends of the side-braces of the car.

2 indicates the side sheathing attached to the side plates by bolts 3 (Fig. 2); 4 is the ridge pole consisting preferably of a U-shaped channel iron having side flanges 6, which are attached to the carlines by rivets 35 or other suitable means, such as electric spot-welding. The ends of the ridge pole are supported by end plates 5, through any suitable connection, one of such end plates being indicated at 5 in Figs. 5 and 11. At its ends the ridge pole is formed on its upper side with an offset 7 to receive the top flange 8 of the end plate and leave the top surface of the ridge pole and end plate coincident with the bottom surface of the roof sheet (Fig. 11). The ridge pole is attached to the flange 8 by rivets 18 which pass through the flanges 6.

The carlines are shown at 9, each formed upon an arc or curve and adapted to extend from side plate to side plate across the ridge pole 4. The body of the carline consists of a horizontal web 11, formed at its sides with upstanding flanges 12 which terminate in curved flanges 13 extending outward away from the carline in directions longitudinal of the car, and then downward, the said curved flanges 13 approximating a half circle in contour and extent. At its ends the carline terminates in vertical flanges 10 turned down over and at the outer sides of the side plates, each of said flanges 10 being perforated by a hole 17 for a rivet 15 which secures the carline to the side plate. The flanges 12 and 13 terminate at the upper part of the flange 10, and in line with them the flange 10 confines the adjacent ends of the downturned eaves flanges of the roof sheets against the side plate 1, said flange 10 being recessed (Figs. 6 and 3) to fit over such sheet-flange ends.

14 indicates the purlins, one or more of which is or are arranged underneath the carlines and roof sheets and between the ridge pole and the side plate, at each side of the car. The purlin is supported at its ends by the end plates 5, to which it is or may be attached by rivets. At these points the end of the purlin is formed on its upper side with an offset to receive the top flange 8 of the end plate and leave the top surfaces of the purlin and end plate coincident with the bottom surface of the roof sheets, in the same manner as has been described with reference to the ridge pole. The purlin is or may be of the same form as the ridge pole, with side flanges 19. The purlin is attached to each carline 9 by rivets 20 which pass through the flanges 19 and through the web 11 of the carline. Electric spot-welding may be used for these attachments of the purlin or ridge pole, but it is preferred to use attaching means which can draw the purlin more or less toward or against the under side of the carline, to press the roof sheets firmly into place.

Each end plate consists of an angle iron 5, Z-shaped in cross-section, (Fig. 11), the top horizontal flange 8 of which is arched to conform to the contour of the roof and which supports the end portion of the end roof sheet 21. The inner transverse edge of this roof sheet is flanged, as hereinafter described with reference to the intermediate roof sheets, and its outer transverse edge is flanged down over the end fascia 22 as shown at 23 (Fig. 11). The side and end sheathing may be constructed with the boards running horizontally, or vertically, as may be preferred.

The carlines 9 are preferably formed by dies, from steel of suitable strength and malleability. At each end the carline has its bottom web 11 formed with horizontal seats 26, the metal of the web being pressed downward out of the normal arc of the carline for such purpose. These seats 26 rest and fit on the top horizontal members of the side-plate Z-bars, to which they are secured by rivets 27.

The described construction of carline gives great rigidity and weight-supporting efficiency in proportion to its own weight, and is adapted by means of the curved flanges 13 for rigid union with the roof sheets when the latter are shaped and combined therewith as about to be described. The contour of the carline cross-section is such that its neutral axis is substantially central, the portions respectively in tension and in compression being so distributed as to give highly effective resistance to the strains to which the carline is subjected. The carline is preferably formed by dies at one swaging operation, and is designed in form to be adapted to such mode of manufacture.

28 is the roof sheet (Fig. 4) which is formed on an arc or curve to correspond with the carlines and to extend across the car, over the ridge pole and over the side plates 1. At its ends it is formed with depending vertical flanges 29 which fit over and against the side plates 1, to which they are secured by bolts 30. The front and rear ends of the flanges 29 fit under the lateral recesses of the flanges 10 of the carlines. The body of the roof sheet is or may be suitably corrugated to increase its thickness and weight-sustaining capacity. Transverse corrugations 31 are illustrated arranged in the spaces between carlines, and may be of suitable number. As shown in Fig. 4 the corrugations are made relatively long so as to extend across the ridge pole and to a considerable distance at each side thereof. Along each side and extending substantially from side to side of the car the roof sheet is formed with an S-flange 32 of such shape and extent that the lower bend or shoulder 33 may brace firmly against the flange 12 of the carline, and that the upper bend or shoulder 34 braces in the opposite direction tightly against the inner surface of the lip of the curved flange 13 of the carline (Fig. 8). The arrangement is such that the bottom surfaces of the roof sheet and of the carline are or may be flush with one another, both resting on the ridge pole, and on the purlins 14. The firm union of the roof sheets with the carlines and the bracing effect of the side flanges of the roof sheets in both directions longitudinal of the roof and transverse to the carlines give great rigidity and strength to the roof as a whole.

37 is the running board (Figs. 5 and 9) the parts of which are connected by bolts 38 with the horizontal flange of an angle iron 39. The vertical flange of the latter is secured by bolts or rivets 40 to the vertical legs of angle irons 41, and the feet of the latter are riveted at 42 directly to the web plate 11 of the carline between the vertical flanges 12 of the latter. Such a connection as is above described is or may be effected between the running board and each of the carlines. The roof plates at the ends of the car omit one of the S-flanges as already described.

In the structure described the roof is greatly simplified, and very few parts are necessary to the production of a light, impervious, strong and self-sustaining metal roof. The roof frame with which are combined the roof sheets, may be of construction suitable for the described roof sheets. In the illustrations the frame comprises the side and end plates 1 and 5, the ridge pole, the carlines and the purlins, so riveted closely together as to constitute the frame a multiplicity of rigid rectangles, whereby the whole is held four-square against distorting strains. The carlines are directly supported by the side plates and ridge pole, and the roof sheet has at each side a lower shoulder 33 which is presented away from the body of the roof sheet and may abut a corresponding shoulder on the roof frame, and the sheet has also a higher shoulder 34 which is presented toward the body of the sheet, substantially opposite to the presentation of the lower shoulder, and against a corresponding shoulder of the frame, the said shoulder being tightly abutted. Pairs of carlines are thus held together by the shoulders 34 and braced apart by the shoulders 33 with a result of stiffening the roof from end to end, without any liability of the sheets being torn or displaced by horizontal or other strains imposed on the roof.

The roof sheets are made of very stiff steel, about sixteen gage being suitable. The carlines are formed from a considerably thicker metal, but their formation, with high and widely separated side flanges, gives them great stiffness. Also the carlines are strengthened and stiffened both laterally and vertically by the combination therewith of the roof sheet flanges. As a result my improved carline is materially lighter in proportion to its supporting and bracing capacity than are the carlines usually employed; and this is true of the roof as a whole. The roof sheets are not loose, floating members, but are combined as supporting tension and compression members in the rigid roof structure. There has been objection to rigidly attaching the roof sheets, owing mainly to the fact that they were perforated for nails or bolts, or otherwise secured in such manner that localized strains would cause them to be torn and displaced. This objection is obviated in my improved structure, the area of attachment along the carline being so great and of such a nature that strains on the roof sheets are widely distributed and not localized at bolt or rivet holes. Downward pressure on the roof sheet forces the shoulder 34 still more tightly against the carline flange 13, the purlins 14 forming supports extending longitudinally from the carline under the sides of the roof sheets, and acting as fulcra.

The only exposed parts are the carlines and roof sheets, and these are imperforate on top; or, where the carlines are perforated, the holes are permanently sealed by rivets; so that the roof is perfectly watertight. The joints between the roof sheets and carlines are obviously of such character as to turn back water and prevent leakage at all of the points where said members are joined. The roof sheets combine with the carlines in tying the side plates together, and the side-plates are also braced apart by the carlines through the media of the rivets 15, 27. Any strain on the roof sheet tending to pull it away from the carline acts on the shoulder 34, which is the higher shoulder situated above and at a distance from the flat body of the sheet through which the strain would be communicated to the shoulder, so that the S-flange of the sheet, rather than its flat portion, takes up such strains. The corrugations of the sheet take up horizontal compression strains, so that the sheet will not be buckled thereby. The structure requires no seam-caps for weather-proofing the juncture of the sheets with the carlines, in view of the nature of that juncture, as above set forth.

The running board supports are carried directly by the carlines independently of any other parts of the roof. In assembling the parts of the roof it is convenient to fit the roof sheets in place over the side plates, and then to apply the carlines to the side plates and roof sheets so that the curved flanges of the carlines engage the S-flanges of the roof sheets, although the latter may not then be in their final fixed position. Then the ridge pole may be applied beneath the carlines and roof sheets and brought up into position, so as to firmly secure the middle portions of the roof sheets, by means of the rivets 35 (Fig. 8). Then the purlins may be put in place (Fig. 13) and drawn up against the roof sheets and carlines by means of the rivets 20 (Fig. 9). These operations may bring all parts to a tight fit without necessarily causing the purlin or ridge pole to contact with the under side of the carline (Fig. 14). On the other hand, in some instances, the roof sheets will be held secure without necessarily causing their lower shoulders 33 to abut against the carline (Fig. 15). In such last condition it will be observed that the roof sheets are held from horizontal movement or tensioned by means of the upper shoulders 34, the said shoulders of each sheet being pressed oppositely against a pair of fixed carlines. After the purlin has been drawn up tightly it may thereby be caused, under the great resistance of the S-flanges of the sheets, to have a slight upward bend at its middle portion under the carline, and to bend downward slightly between the carlines, this condition being illustrated in Fig. 16.

44 is an eaves flashing angle plate (Fig. 12), each of such plates inclosing the side plate by a vertical web 45 and horizontal web 46 (Fig. 2). Preferably one of such flashing plates extends from one carline to the next carline, and may be held in position by one or more rivets or bolts (or by the bolt 30) passing through corresponding holes 47 in the vertical web 45. The inner edge of the web 46 terminates in an upward and outward bend 48 which extends up substantially to the under side of the roof sheet (Fig. 2) and serves to catch and turn back any leakage which might force in under the downturned flanges 29 of the roof sheets.

The end flanges 10 of the carline are preferably formed with escape openings 49 arranged in line with the lower portions of the S-shaped bends of the roof sheets, so as to permit the escape at each side of each end of the carline of water, cinders, etc., caught by the said bends of the roof sheets.

What is claimed is:

1. In a metal car roof, in combination: a roof frame arranged for the support of the roof sheets; and metal roof sheets having at each side an upstanding flange with a lower shoulder presented away from the body of the sheet and a higher shoulder presented toward the body of the sheet; the said roof frame being provided with rigid opposing shoulders against which the said shouldered flanges of the roof sheets are tightly abutted; substantially as specified.

2. In a metal car roof, in combination: a roof frame arranged for the support of the roof sheets; and metal roof sheets having at each side an upstanding flange with a lower shoulder presented away from the body of the sheet and a higher shoulder at a distance above the body of the roof sheet and presented toward the body of the sheet; the said roof frame being provided with rigid opposing shoulders against which the said shoulders of the roof sheets are tightly abutted in both directions longitudinally of the car; substantially as specified.

3. In a metallic car roof, in combination: a roof frame arranged for the support of the roof sheets; and metal roof sheets having at each side an upstanding S-flange which presents two shoulders in opposite directions, a lower shoulder away from the body of the sheet and a higher shoulder toward the body of the sheet; said roof frame having rigid members provided with corresponding shoulders against which the said shoulders of the roof sheets are tightly abutted; substantially as specified.

4. In a metallic car roof, in combination: rigid carlines having upstanding flanges at their sides adapted to extend over and partly around the edges of the roof sheets; and roof sheets having upstanding flanged sides which present a lower shoulder to the carline, and a higher shoulder away from the body of the carline and against the inner face of the carline flange, the intermediate part of each roof sheet flange extending across from its said lower shoulder to its upper shoulder and both of said shoulders being braked in opposite directions, against the parts of the carline; substantially as specified.

5. In a metallic car roof, in combination: rigid carlines having upstanding flanges at their sides adapted to extend over and partly around the edges of the roof sheets; the roof sheets having upstanding sides in the form of S-flanges which present a lower shoulder to the carline, and a higher shoulder away from the body of the carline and against the inner face of the carline flange, both of said shoulders being braced, but in opposite directions, against the parts of the carline; substantially as specified.

6. In a metal car roof, in combination: side plates; upwardly flanged roof sheets extending from side to side of the car and over the side plates; longitudinal roof frame members beneath the roof sheets; and carlines having side flanges overhanging and engaging the flanges of the roof sheets, said flanges of the roof sheets being rigidly clamped and held with upward pressure against the carline flanges, transmitted through the vertical component of said flanges.

7. In a metal car roof, in combination: side plates; upwardly flanged roof sheets extending from side to side of the car and over the side plates, the flanges of said sheets being bent to extend over and above the bodies of the sheets; longitudinal roof frame members beneath the roof sheets; and carlines having side flanges overhanging and engaging the flanges of the roof sheets, said flanges of the roof sheets being rigidly clamped and held with upward pressure against the carline flanges, transmitted through the vertical component of said flanges.

8. In a metal car roof, in combination: rigid carlines having upstanding flanges at their sides adapted to extend over and partly around the edges of the roof sheets; and roof sheets having upstanding S-flanged sides which present a lower shoulder to the carline, and a higher shoulder away from the body of the carline and against the inner face of the carline flange, both of said shoulders being braced, but in opposite directions, against the parts of the carline, the said carlines being flattened at their ends, and terminating in vertical depending flanges formed with recesses on their inner sides to receive the edges of the roof sheet flanges; substantially as specified.

9. In a metal car roof frame, in combination: side plates; end plates having horizontal and vertical flanges; a ridge pole and purlins bent down at their ends to form offsets on their upper sides and fitted and secured to the under side of the horizontal flanges of the end plates; roof sheets laid on the ridge pole; and carlines laid on the ridge pole, purlins and side plates between the roof sheets and interlocked with the roof sheets; substantially as specified.

10. In a metal car roof frame, in combination with the side plates: carlines of arched channeled form, with outwardly recurved lateral flanges, the web of the arched channel between said lateral flanges being bent down below the line of the arch to form horizontal seats at each end, the seats fitting on the side plates, and the upper edges of the flanges continuing the line of the arch; substantially as specified.

11. In a metal car roof frame, in combination: side plates consisting of Z-bars having top horizontal members; and carlines of arched channeled form, with outwardly recurved lateral flanges, the web of the arched channel between said lateral flanges being bent down below the line of the arch to form horizontal seats and a depending flange at each end, the seats resting on and secured to the top member of the Z-bars and the upper edges of the said lateral flanges continuing the line of the arch, and the depending flange secured to the vertical member of the Z-bars; substantially as specified.

12. In a metal car roof frame, in combination: side plates; and carlines of arched form, provided with horizontal seats at each end fitting on the side plates, and with depending flanges formed with vertical recessed seats for the ends of the eaves flanges of the roof sheets and fitting the outer sides of the side plates; substantially as specified.

13. In a metal car roof, in combination: arched carlines having overhanging flanges at each side thereof; roof sheets having upstanding flanges at each side thereof arranged to overhang the body of roof sheets; said flanges being spread transversely of the carline within the overhanging flanges thereof; roof frame elements beneath the carlines and the roof sheets; and means for forcing the roof sheets upward to cause their flanges to engage with and press against the flanges of the carlines; substantially as specified.

14. In a car roof, in combination: side plates; carlines resting on the side plates; roof sheets inclosing the side plates by depending flanges; and eaves flashings extending between the carlines, inclosing the side plates by vertical and horizontal webs, and having the inner edges of the horizontal webs formed with upstanding outwardly rebent flanges engaging the under surfaces of the roof sheets and effecting a weatherproof closure therewith.

15. A car roof constituted of side plates, end plates, longitudinally extending sheet-supporting members, sheets arched across the car and having upwardly bent and laterally extended side flanges; and arched channel-carlines formed with widely separated side flanges which are widely flaring and recurved downward over the said sheet-flanges.

16. In a car roof, in combination: rigid carlines formed with elevated flanges extending away from the median lines of the carlines; roof sheets having side flanges bent upward and laterally and held under compression under the flanges of the carlines; longitudinally extending members engaging beneath the roof sheets; and means for forcing said longitudinal members toward the said flanges of the carlines to secure the flanges of the roof sheets between the said longitudinally extending members and the said flanges of the carlines.

17. In a car roof, in combination: rigid carlines formed with elevated flanges extending away from the median lines of the carlines; roof sheets having side flanges bent upward and laterally and held under compression under the flanges of the carlines; purlins engaging beneath the roof sheets; and means for forcing said purlins toward the said flanges of the carlines to clamp the flanges of the roof sheets between the said purlins and the said flanges of the carlines.

18. A car roof sheet having upstanding S-shaped lateral flanging rebent over the body of the roof sheet for engagement with adjacent roof-members.

19. A carline adapted to extent from side-plate to side-plate when assembled as a roof-member in a car roof, said carline having a central longitudinal channel with widely separated and outwardly flaring and recurved side-flanges adapted for inclosing and retaining correspondingly shaped roof-sheet side-flanges extending from side to side of a car.

20. A carline having a central longitudinal channel with outwardly flaring recurved flanges, the neutral axis of the cross-section being substantially central and, above it, the carline being widely extended laterally, and the tension and the compression members of the carline offering great resistance in both tension and compression and against lateral or horizontal bending.

21. The herein described pressed steel arched carline for car roofs, formed with a bottom web and with side flanges pressed up from the bottom web and inclined upwardly and outwardly therefrom and terminating in downwardly bent flanges, the bottom web near the ends of the carline being flattened and pressed down within the line of the arch of the bottom of the carline to form supporting seats.

22. A carline having a central longitudinal channel with outwardly flaring recurved flanges, the portion of the carline above the neutral axis of the cross-section being widely extended laterally, and the tension and the compression members of the carline offering great resistance in both tension and compression and against lateral or horizontal bending.

23. In a metal car roof, in combination: roof sheets formed with side flanges having a vertical spring yielding action during their compression into place; carlines and purlins between which the said side flanges of the roof sheets are held; and means for forcing the carlines and purlins together to compress the said side flanges of the roof sheets.

24. In a metal car roof, in combination: roof sheets formed with side flanges having a vertical spring yielding action during their compression into place; carlines and longitudinally extending sheet-supporting members between which the said side flanges of the roof sheets are held; and means for forcing the carlines and said sheet-supporting members together to compress the said side flanges of the roof sheets.

25. In a car roof, a rigid roof frame comprising carlines having outwardly and downwardly extending rigid side flanges, combined with roof sheets having upstanding side flanges which are bent laterally with respect to the carlines and comprise bracing portions extending across the space within the carline flanges and bracing rigidly both inwardly toward and against the carlines and outwardly toward and against the downwardly extending parts of the said carline flanges.

26. In a metal car roof, in combination: a roof frame comprising side plates, end plates, a ridge pole, carlines and purlins, the carlines being closely united with the ridge pole and with the purlins at each intersection by a plurality of spaced rigid fastenings, such as rivets, whereby the said frame is constituted of a multiplicity of rigid rectangles and the whole frame is held four-square against distorting strains; and roof sheets covering said rectangles and rigidly held by and between members of the said frame; substantially as specified.

In testimony whereof, I have hereunto set my hand in the presence of two subscribing witnesses.

THOMAS NATHAN RUSSELL.

Witnesses:
E. M. HADLEY,
J. W. BERNBAUM.

It is hereby certified that in Letters Patent No. 1,177,144, granted March 28, 1916, upon the application of Thomas Nathan Russell, of Chicago, Illinois, for an improvement in "Car-Roofs," errors appear in the printed specification requiring correction as follows: Page 4, line 115, claim 4, for the word "braked" read *braced;* page 5, line 93, claim 13, for the words "roof sheets" read *the roof sheet;* same page and claim, line 99, for the word "with" read *within;* page 6, line 24, claim 19, for the word "extent" read *extend;* and that the said Letters Patent should be read with these corrections therein that the same may conform to the record of the case in the Patent Office.

Signed and sealed this 23d day of May, A. D., 1916.

[SEAL.]

J. T. NEWTON,

*Acting Commissioner of Patent.*

Cl. 108—5.4.